United States Patent
Delsesto et al.

(10) Patent No.: US 9,603,058 B2
(45) Date of Patent: Mar. 21, 2017

(54) METHODS, SYSTEMS, AND COMPUTER READABLE MEDIA FOR TRIGGERING A SERVICE NODE TO INITIATE A SESSION WITH A POLICY AND CHARGING RULES FUNCTION

(75) Inventors: Mark Delsesto, Hudson, NH (US);
Yusun Kim Riley, Weston, MA (US);
Uri Baniel, Buffalo Grove, IL (US)

(73) Assignee: Tekelec, Inc., Morrisville, NC (US)

( * ) Notice: Subject to any disclaimer, the term of this patent is extended or adjusted under 35 U.S.C. 154(b) by 213 days.

(21) Appl. No.: 13/048,597

(22) Filed: Mar. 15, 2011

(65) Prior Publication Data
US 2011/0225306 A1    Sep. 15, 2011

Related U.S. Application Data

(60) Provisional application No. 61/313,953, filed on Mar. 15, 2010, provisional application No. 61/315,130,
(Continued)

(51) Int. Cl.
*G06F 15/173* (2006.01)
*G06F 15/16* (2006.01)
(Continued)

(52) U.S. Cl.
CPC ....... *H04W 28/18* (2013.01); *H04L 29/12896* (2013.01); *H04L 29/12905* (2013.01);
(Continued)

(58) Field of Classification Search
CPC ..................... H04L 12/1407; H04L 65/1016
(Continued)

(56) References Cited

U.S. PATENT DOCUMENTS 6,141,686 A    10/2000 Jackowski et al.
6,651,101 B1   11/2003 Gai et al.
(Continued)

FOREIGN PATENT DOCUMENTS

CN    1849787 A       10/2006
CN    101589634 A     11/2009
(Continued)

OTHER PUBLICATIONS

3GPP, 3rd Generation Partnership Project, Policy and Charging Control over Gx reference point (Release 8), May 2008.*
(Continued)

*Primary Examiner* — Suraj Joshi
*Assistant Examiner* — Sherman Lin
(74) *Attorney, Agent, or Firm* — Jenkins, Wilson, Taylor & Hunt, P.A.

(57) ABSTRACT

According to one aspect, the subject matter described herein includes a method for initiating a session. The method includes steps occurring at a policy and charging rules function (PCRF) node. The method also includes determining, independent of contact from a service node, that the service node requires policy information. The method further includes in response to determining that the service node requires policy information, communicating a session independent trigger message to the service node, wherein the trigger message comprises information instructing the service node to initiate a session with the PCRF node to obtain the policy information from the PCRF node.

21 Claims, 5 Drawing Sheets

Related U.S. Application Data filed on Mar. 18, 2010, provisional application No. 61/322,533, filed on Apr. 9, 2010.

(51) Int. Cl.

| | | |
|---|---|---|
| *H04W 28/18* | (2009.01) | |
| *H04L 29/12* | (2006.01) | |
| *H04M 15/00* | (2006.01) | |
| *H04W 4/24* | (2009.01) | |
| *H04W 8/26* | (2009.01) | |
| *H04W 24/00* | (2009.01) | |

(52) U.S. Cl.
CPC .......... *H04L 61/106* (2013.01); *H04L 61/605* (2013.01); *H04L 61/6054* (2013.01); *H04M 15/00* (2013.01); *H04M 15/66* (2013.01); *H04W 4/24* (2013.01); *H04W 8/26* (2013.01); *H04W 24/00* (2013.01)

(58) Field of Classification Search
USPC .................................................. 709/227, 223
See application file for complete search history.

(56) References Cited

U.S. PATENT DOCUMENTS

| | | |
|---|---|---|
| 6,661,780 B2 | 12/2003 | Li |
| 6,880,005 B1 | 4/2005 | Bell et al. |
| 7,209,962 B2 | 4/2007 | Boden |
| 7,289,498 B2 | 10/2007 | Yu et al. |
| 7,581,249 B2 | 8/2009 | Bussiere et al. |
| 7,719,966 B2 | 5/2010 | Luft et al. |
| 7,940,683 B2 | 5/2011 | Dolganow et al. |
| 8,005,087 B2 | 8/2011 | Dolganow et al. |
| 8,042,148 B2 | 10/2011 | Andreasen et al. |
| 8,131,831 B1 | 3/2012 | Hu |
| 8,146,133 B2 | 3/2012 | Moon et al. |
| 8,159,941 B2 | 4/2012 | Dolganow et al. |
| 8,250,646 B2 | 8/2012 | Zheng |
| 8,331,229 B1 | 12/2012 | Hu et al. |
| 8,429,268 B2 | 4/2013 | Riley et al. |
| 8,433,794 B2 | 4/2013 | Baniel et al. |
| 8,458,767 B2 | 6/2013 | Riley et al. |
| 8,467,291 B2 | 6/2013 | Lövsén et al. |
| 8,595,368 B2 | 11/2013 | Baniel et al. |
| 8,640,188 B2 | 1/2014 | Riley et al. |
| 8,718,075 B2 | 5/2014 | Cai et al. |
| 8,813,168 B2 | 8/2014 | Riley et al. |
| 9,166,803 B2 | 10/2015 | Riley et al. |
| 9,319,318 B2 | 4/2016 | Riley et al. |
| 2002/0052806 A1* | 5/2002 | Hodson et al. ................. 705/27 |
| 2002/0143914 A1 | 10/2002 | Cihula |
| 2002/0188562 A1* | 12/2002 | Igarashi et al. ................. 705/40 |
| 2003/0208523 A1 | 11/2003 | Gopalan et al. |
| 2004/0111519 A1 | 6/2004 | Fu et al. |
| 2005/0088977 A1 | 4/2005 | Roch et al. |
| 2005/0122945 A1 | 6/2005 | Hurtta |
| 2006/0013191 A1 | 1/2006 | Kavanagh |
| 2006/0174012 A1* | 8/2006 | Yamazaki et al. ............ 709/227 |
| 2006/0233101 A1 | 10/2006 | Luft et al. |
| 2007/0004393 A1 | 1/2007 | Forsberg et al. |
| 2007/0066286 A1 | 3/2007 | Hurtta |
| 2007/0121812 A1 | 5/2007 | Strange et al. |
| 2007/0159976 A1 | 7/2007 | Dekeyzer et al. |
| 2007/0220251 A1 | 9/2007 | Rosenberg et al. |
| 2007/0226775 A1 | 9/2007 | Andreasen et al. |
| 2007/0242692 A1 | 10/2007 | Limb et al. |
| 2007/0286117 A1 | 12/2007 | Balasubramanian et al. |
| 2008/0046963 A1 | 2/2008 | Grayson et al. |
| 2008/0076388 A1 | 3/2008 | Nochimowski et al. |
| 2008/0120700 A1 | 5/2008 | Pandey et al. |
| 2008/0137541 A1 | 6/2008 | Agarwal et al. |
| 2008/0201772 A1 | 8/2008 | Mondaeev et al. |
| 2008/0232376 A1 | 9/2008 | Huang et al. |
| 2008/0263631 A1 | 10/2008 | Wang et al. |
| 2008/0276305 A1 | 11/2008 | Chan et al. |
| 2008/0313708 A1 | 12/2008 | Khan et al. |
| 2008/0316971 A1 | 12/2008 | Shaheen |
| 2009/0089418 A1 | 4/2009 | Saha et al. |
| 2009/0141625 A1 | 6/2009 | Ghai et al. |
| 2009/0177650 A1 | 7/2009 | Petersson et al. |
| 2009/0196225 A1 | 8/2009 | Avila Gonzalez et al. |
| 2009/0222538 A1 | 9/2009 | Takahashi et al. |
| 2009/0227231 A1 | 9/2009 | Hu et al. |
| 2009/0228956 A1 | 9/2009 | He et al. |
| 2009/0282225 A1 | 11/2009 | Caprioli et al. |
| 2009/0285225 A1 | 11/2009 | Dahod |
| 2009/0307028 A1 | 12/2009 | Eldon et al. |
| 2009/0323536 A1 | 12/2009 | Liu et al. |
| 2010/0039941 A1* | 2/2010 | Tan .......................... H04L 12/14 370/241 |
| 2010/0040047 A1 | 2/2010 | Zamora et al. |
| 2010/0048161 A1 | 2/2010 | He et al. |
| 2010/0121960 A1 | 5/2010 | Baniel et al. |
| 2010/0142373 A1 | 6/2010 | Jin et al. |
| 2010/0185488 A1 | 7/2010 | Hogan et al. |
| 2010/0186064 A1 | 7/2010 | Huang et al. |
| 2010/0217877 A1 | 8/2010 | Willars et al. |
| 2010/0235877 A1 | 9/2010 | Hu et al. |
| 2011/0022702 A1 | 1/2011 | Riley et al. |
| 2011/0022722 A1 | 1/2011 | Castellanos Zamora et al. |
| 2011/0041182 A1 | 2/2011 | Stenfelt |
| 2011/0111767 A1* | 5/2011 | Livanos ..................... 455/452.2 |
| 2011/0167471 A1 | 7/2011 | Riley et al. |
| 2011/0170412 A1 | 7/2011 | Ramadas et al. |
| 2011/0202653 A1 | 8/2011 | Riley et al. |
| 2011/0219426 A1 | 9/2011 | Kim et al. |
| 2011/0225280 A1 | 9/2011 | Delsesto et al. |
| 2011/0225309 A1 | 9/2011 | Riley et al. |
| 2011/0246586 A1 | 10/2011 | Steele |
| 2011/0296489 A1 | 12/2011 | Fernandez Alonso et al. |
| 2012/0084425 A1 | 4/2012 | Riley et al. |
| 2012/0131165 A1 | 5/2012 | Baniel et al. |
| 2012/0144049 A1 | 6/2012 | Lopez Nieto et al. |

FOREIGN PATENT DOCUMENTS

| | | |
|---|---|---|
| CN | ZL200980130515.0 | 2/2015 |
| CN | ZL201180017408.4 | 2/2015 |
| CN | ZL201180013382.6 | 5/2015 |
| CN | ZL201180024178.4 | 3/2016 |
| EP | 1 501 242 A2 | 1/2005 |
| EP | 1 551 144 A1 | 7/2005 |
| EP | 2 045 974 A1 | 4/2009 |
| EP | 2 289 283 | 5/2015 |
| KR | 10-2006-0028042 | 3/2006 |
| KR | 10-2009-0027861 | 3/2009 |
| WO | WO 2007/092573 A2 | 8/2007 |
| WO | WO 2008/000287 A1 | 1/2008 |
| WO | WO 2008/052744 A2 | 5/2008 |
| WO | WO 2008/114217 A5 | 9/2008 |
| WO | WO 2008/131689 A1 | 11/2008 |
| WO | WO 2009/149341 A2 | 12/2009 |
| WO | WO 2010/086013 A1 | 8/2010 |
| WO | WO 2011/011790 A2 | 1/2011 |
| WO | WO 2011/082035 A2 | 7/2011 |
| WO | WO 2011/082036 A2 | 7/2011 |
| WO | WO 2011/100684 A2 | 8/2011 |
| WO | WO 2011/109821 A2 | 9/2011 |
| WO | WO 2011/115991 A2 | 9/2011 |

OTHER PUBLICATIONS

Notice of Allowance and Fee(s) Due for U.S. Appl. No. 13/225,390 (Oct. 9, 2012).
Non-Final Official Action for U.S. Appl. No. 12/479,179 (Sep. 13, 2012).
European Searhc Report for European Patent Application No. EP 09 75 9499 (Sep. 12, 2012).
Non-Final Official Action for U.S. Appl. No. 12/973,186 (Aug. 24, 2012).
Applicant-Initiated Interview Summary for U.S. Appl. No. 13/225,390 (Aug. 13, 2012).

(56) References Cited

OTHER PUBLICATIONS

Non-Final Official Action for U.S. Appl. No. 13/042,294 (Jun. 20, 2012).
Notice of Allowance and Fee(s) Due for U.S. Appl. No. 12/621,190 (May 29, 2012).
Non-Final Official Action for U.S. Appl. No. 13/225,390 (May 14, 2012).
Communication of European publication number and information on the application of Article 67(3) EPC for European Application No. 10803020.6 (May 4, 2012).
Final Official Action for U.S. Appl. No. 12/479,179 (Apr. 10, 2012).
Applicant-Initiated Interview Summary for U.S. Appl. No. 12/621,190 (Feb. 7, 2012).
Notification of Transmittal of the International Search Report and the Written Opinion of the International Searching Authority, or the Declaration for the International Patent Application No. PCT/US2010/061589 (Sep. 26, 2011).
Non-Final Official Action for U.S. Appl. No. 12/479,179 (Aug. 2, 2011).
Restriction Requirement for U.S. Appl. No. 12/479,179 (Feb. 8, 2011).
Notification of Transmittal of the International Search Report and the Written Opinion of the International Searching Authority, or the Declaration for International Application No. PCT/US2009/046395 (Dec. 28, 2009).
"Chapter 1: Overview of GPRS and UMTS," Cisco GGSN release 9.0 Configuration Guide, Cisco IOS Release 12.4(22)YE, pp. 1-1-1-16 (Aug. 4, 2009).
"Introduction to Diameter," Wikipedia, pp. 1-12 (Downloaded from the Internet on May 15, 2009).
"Diameter Credit-Control Application," Wikipedia, pp. 1-7 (Downloaded from the Internet on May 13, 2009).
"Diameter (Protocol)," Wikipedia, pp. 1-8 (Downloaded from the Internet on May 13, 2009).
"File: GPRS Core Structure.phg," Wikipedia, pp. 1-3 (Downloaded from the Internet on May 13, 2009).
"GPRS Core Network," Wikipedia, pp. 1-6 (Downloaded from the Internet on May 13, 2009).
"GPRS Network Architecture," DenMasBroto, pp. 1-2 (Downloaded from the Internet on May 13, 2009) (May 28, 2008).
3rd Generation Partnership Project, "Technical Specification Group Core Network and Terminals; Policy and Charging Control over Gx Reference Point," 3GPP TS 29.212, V8.0.0, Release 8 (May 2008).
Agilent Technologies, "Understanding DSLAM and BRAS Access Devices," White Paper, pp. 1-15 (2006).
"GPRS Tutorial," MorganDoyle Limited, pp. 1-13 (Publication Date Unknown).
Notification of Transmittal of the International Search Report and the Written Opinion of the International Searching Authority, or the Declaration for International Application No. PCT/US2011/027427 (Nov. 15, 2011).
Notification of Transmittal of the International Search Report and the Written Opinion of the International Searching Authority, or the Declaration for International Application No. PCT/US2011/028520 (Oct. 31, 2011).
Notification of Transmittal of the International Search Report and the Written Opinion of the International Searching Authority, or the Declaration for International Application No. PCT/US2011/024753 (Oct. 28, 2011).
Non-Final Official Action for U.S. Appl. No. 12/621,190 (Aug. 3, 2011).
Notification of Transmittal of the International Search Report and the Written Opinion of the International Searching Authority, or the Declaration for International Application No. PCT/US2010/043258 (Feb. 28, 2011).
"3rd Generation Partnership Project; Technical Specification Group Core Network and Terminals; Policy and Charging Control over Rx reference point (Release 9)," 3GPP TS 29.214, V9.3.0, pp. 1-45 (Mar. 2010).

"Universal Mobile Telecommunications System (UMTS); LTE; Policy and charging control over Rx reference point (3GPP TS 29.214 version 9.2.0 Release 9)," ETSI TS 129 214, V9.2.0 (Jan. 2010).
"Universal Mobile Telecommunications System (UMTS ); LTE; Policy and charging control over Gx reference point (3GPP TS 29.212 version 9.1.0 Release 9)," ETSI TS 129 212, V9.1.0 (Jan. 2010).
3rd Generation Partnership Project, Technical Specification Group Core Network and Terminals; Policy and Charging Control Over Gx reference point (Release 9), 3GPP TS 29.212, V9.1.0, pp. 1-106 (Dec. 2009).
Hakala et al., "Diameter Credit-Control Application," Network Working Group RFC 4006, pp. 1-114 (Aug. 2005).
Zhou et al., "Prophet Address Allocation for Large Scale MANETs," Ad Hoc Networks, vol. 1, Issue 4, pp. 423-434 (Nov. 2003).
Calhoun et al., "Diameter Base Protocol," RFC 3588, pp. 1-147 (Sep. 2003).
Ponnappan et al., "A Policy Based QoS Management System for the IntServ/DiffSery Based Internet," Policies for Distributed Systems and Networks, pp. 159-168 (2002).
Final Office Action for U.S. Appl. No. 12/973,186 (May 22, 2013).
Non-Final Office Action for U.S. Appl. No. 13/048,607 (Mar. 4, 2013).
Non-Final Office Action for U.S. Appl. No. 13/048,629 (Feb. 15, 2013).
Final Office Action for U.S. Appl. No. 12/479,179 (Feb. 15, 2013).
Notice of Allowance and Fee(s) Due for U.S. Appl. No. 13/042,294 (Jan. 30, 2013).
Communication of European Publication Number and Information on the Application of Article 67(3) EPC for European Patent Application No. 11756855.0 (Jan. 4, 2013).
Notice of Allowance and Fee(s) Due for U.S. Appl. No. 12/621,190 (Dec. 27, 2012).
Communication of European Publication Number and Information on the Application of Article 67(3) EPC for European Patent Application No. 11751508.0 (Dec. 12, 2012).
Communication of European publication No. and information on the application of Article 67(3) EPC for European Application No. 11742958.9 (Nov. 21, 2012).
3GPP, "Policy and Charging Control Over Rx Reference Point," 3GPP ETSI TS 29.214 version 8.3.0 Release 8 (Feb. 2009).
Non-Final Office Action for U.S. Appl. No. 13/024,967 (Aug. 5, 2013).
Notice of Allowance and Fee(s) Due for U.S. Appl. No. 12/479,179 (Jul. 9, 2013).
Interview Summary for U.S. Appl. No. 12/479,179 (Jul. 1, 2013).
Non-Final Office Action for U.S. Appl. No. 13/157,052 (Jun. 6, 2013).
First Office Action for Chinese Patent Application No. 200980130515.0 (Apr. 24, 2013).
Notice of Allowance and Fee(s) Due for U.S. Appl. No. 12/973,186 (Sep. 19, 2013).
Communication Under Rule 71(3) EPC for European Patent Application No. 09759499.8 (Aug. 14, 2013).
Notification of the Third Office Action for Chinese Application No. 200980130515.0 (Jun. 26, 2014).
Notification of the First Office Action for Chinese Application No. 201180013382.6 (Jun. 20, 2014).
Applicant-Initiated Interview Summary for U.S. Appl. No. 13/024,967 (Jun. 20, 2014).
Notification of the First Office Action for Chinese Application No. 201180017408.4 (Jun. 3, 2014).
Communication of European publication No. And information on the application of Article 67(3) EPC for European Application No. 09759499.8 (Feb. 2, 2011).
Communication of extended European Search Report for European Patent Application No. 10841576.1 (May 9, 2014).
Notice of Allowance and Fee(s) Due for U.S. Appl. No. 13/157,052 (Apr. 14, 2014).

(56) References Cited

OTHER PUBLICATIONS

Applicant-Initiated Interview Summary and Advisory Action Before the Filing of an Appeal Brief for U.S. Appl. No. 13/157,052 (Mar. 17, 2014).
Non-Final Office Action for U.S. Appl. No. 13/024,967 (Mar. 7, 2014).
Decision to grant a European patent pursuant to Article 97(1) EPC for European Application No. 09759499.8 (Jan. 23, 2014).
Advisory Action Before the Filing of an Appeal Brief for U.S. Appl. No. 13/048,629 (Jan. 9, 2014).
Advisory Action Before the Filing of an Appeal Brief for U.S. Appl. No. 13/048,607 (Jan. 7, 2014).
Final Office Action for U.S. Appl. No. 13/157,052 (Jan. 2, 2014).
Second Office Action for Chinese Application No. 200980130515.0 (Dec. 10, 2013).
Final Office Action for U.S. Appl. No. 13/048,629 (Nov. 8, 2013).
Final Office Action for U.S. Appl. No. 13/048,607 (Oct. 25, 2013).
Letter Regarding Decision to grant a Chinese patent for Chinese Application No. ZL201180017408.4 (Dec. 2, 2014).
Letter Regarding Decision to grant a Chinese patent for Chinese Application No. ZL200980130515.0 (Dec. 2, 2014).
Non-Final Office Action for U.S. Appl. No. 13/024,967 (Dec. 1, 2014).
Non-Final Office Action for U.S. Appl. No. 13/048,629 (Oct. 8, 2014).
Non-Final Office Action for U.S. Appl. No. 13/048,607 (Oct. 7, 2014).
Notification of the First Office Action for Chinese Application No. 201180024178.4 (Sep. 25, 2014).
Final Office Action for U.S. Appl. No. 13/048,629 (Aug. 5, 2015).
Second Office Action for Chinese Application No. 201180024178.4 (Jul. 22, 2015).
Notice of Allowance and Fee(s) Due for U.S. Appl. No. 13/024,967 (Jun. 18, 2015).
Final Office Action for U.S. Appl. No. 13/048,607 (May 11, 2015).
Office Action for Canadian Application No. 2,730,103 (Apr. 16, 2015).
Letter Regarding Decision to Grant for Chinese Patent Application No. ZL201180013382.6 (Mar. 9, 2015).
Final Office Action for U.S. Appl. No. 13/048,607 (Sep. 9, 2016).
Commucation of extended European Search Report for European Patent Application No. 11751508.0 (Apr. 18, 2016).
Office Action for CanadianPatent Application No. 2,730,103 (Apr. 8, 2016).
Non-Final Office Action for U.S. Appl. No. 13/048,607 (Feb. 10, 2016).
Letter Regarding Decision to Grant for Chinese Patent Application No. 201180024178.4 (Jan. 11, 2016).
Notice of Allowance and Fee(s) Due, Applicant-Initiated Interview Summary, and AFCP 2.0 Decision for U.S. Appl. No. 13/048,629 (Dec. 14, 2015).
Advisory Action for U.S. Appl. No. 13/048,607 (Sep. 21, 2015).

\* cited by examiner

METHODS, SYSTEMS, AND COMPUTER READABLE MEDIA FOR TRIGGERING A SERVICE NODE TO INITIATE A SESSION WITH A POLICY AND CHARGING RULES FUNCTION

PRIORITY CLAIM

This application claims the benefit of U.S. Provisional Patent Application Ser. No. 61/313,953, filed Mar. 15, 2010; U.S. Provisional Patent Application Ser. No. 61/315,130, filed Mar. 18, 2010; and U.S. Provisional Patent Application Ser. No. 61/322,533, filed Apr. 9, 2010; the disclosure of which are incorporated herein by reference in their entirety.

TECHNICAL FIELD

The subject matter described herein relates to triggering a service node to initiate a session with a policy and charging rules function (PCRF). More specifically, the subject matter relates to methods, systems, and computer readable media for triggering a service node to initiate a session with a PCRF.

BACKGROUND

A PCRF node may be utilized by multimedia networks to determine policy rules in real-time. Utilization of a PCRF may aid a network operator in making real-time, subscriber specific, policy decisions that may be utilized to provide varying levels of quality of service (QoS).

Telecommunications networks may include various service nodes for performing a variety of services. Service nodes may include functionality for deep packet inspection (DPI), content-filtering, and/or web-optimization. DPI is the use of a packet's non-header information by a network entity that is not an endpoint for that packet. DPI is employed by network operators for a wide variety of uses, e.g., anti-virus, spam filtering, intrusion detection, and gathering statistical information. Content-filtering is the blocking of specified content based on analysis of the content itself rather than other criteria such as its source. Web-optimization is provided to enhance a user's experience and may involve refining and/or altering content to better suit the hardware and/or software utilized by a particular user.

Based on operator policy, a PCRF node may need to trigger a service node to initiate a session with the PCRF node.

Accordingly, a need exists for methods, systems, and computer readable media for triggering a service node to initiate a session with a PCRF.

SUMMARY

According to one aspect, the subject matter described herein includes a method for initiating a session. The method includes steps occurring at a PCRF node. The method also includes determining, independent of contact from a service node, that the service node requires policy information. The method further includes in response to determining that the service node requires policy information, communicating a session independent trigger message to the service node, wherein the trigger message comprises information instructing the service node to initiate a session with the PCRF node to obtain the policy information from the PCRF node.

According to another aspect, the subject matter described herein includes a system for initiating a session. The system includes a PCRF node. The PCRF node includes a communication interface. The PCRF node further includes a trigger module. The trigger module is configured to utilize the communication interface to communicate, independent of contact from a service node, a session independent trigger message to the service node, wherein the trigger message comprises information instructing the service node to initiate a session with the PCRF node to obtain policy information from the PCRF node.

As used herein, the term "node" refers to a physical computing platform including one or more processors and memory.

The subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
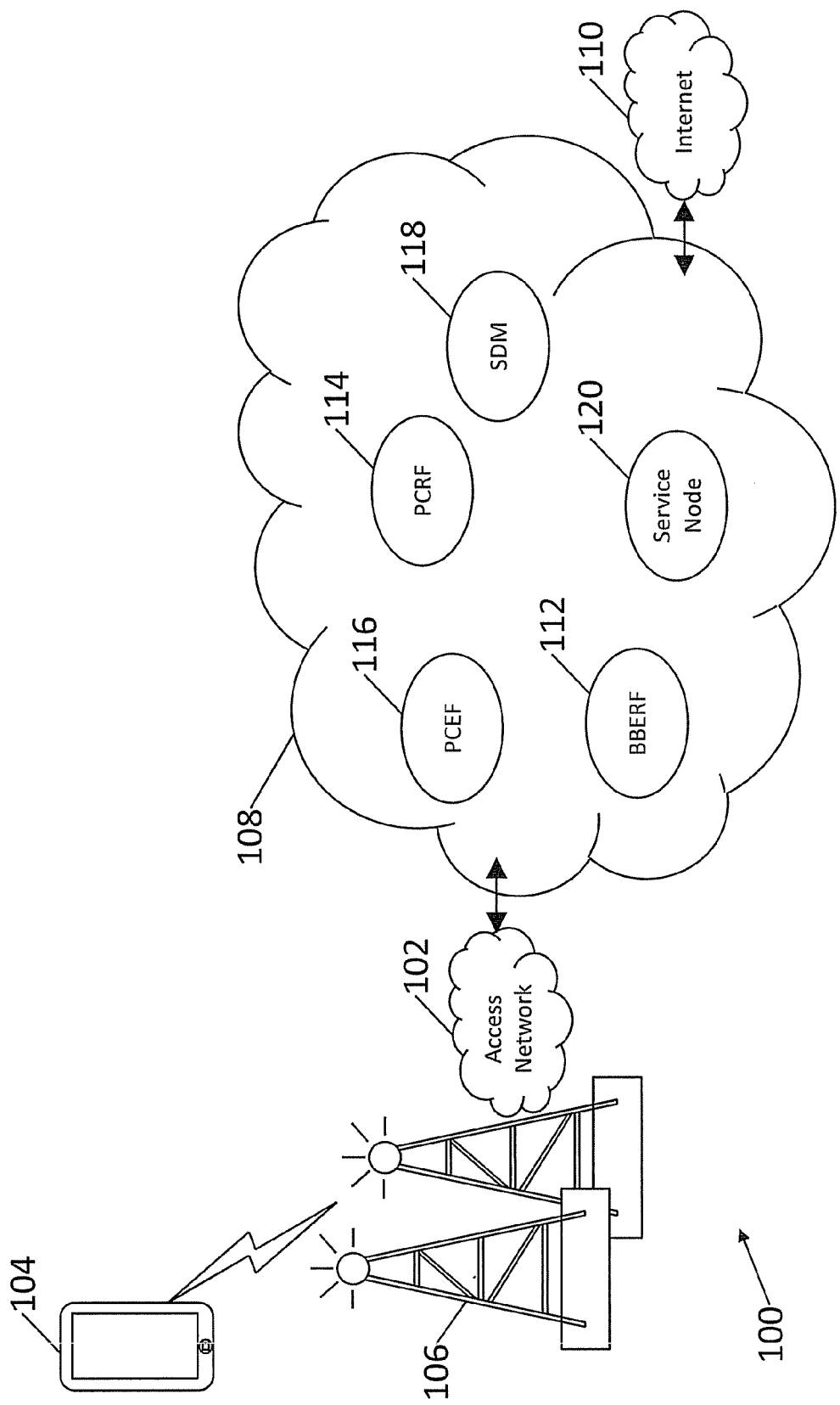
FIG. 1 is a network diagram illustrating an exemplary network environment for triggering a service node to initiate a session with a PCRF according to an embodiment of the subject matter described herein.

Methods, systems, and computer readable media for triggering a service node to initiate a session with a PCRF are provided. FIG. 1 is a network diagram illustrating an exemplary network environment for triggering a service node to initiate a session with a PCRF according to an embodiment of the subject matter described herein. Referring to FIG. 1, network environment 100 may include access network 102. Access network 102 may include nodes, functions, devices, and/or components for providing user equipment (UE) 104 access to services, functions, or devices in one or more networks. In one embodiment, access network 102 may be a radio access network (RAN). For example, access network 102 may be a global system for mobile communications (GSM) RAN (GRAN), a general packet radio service (GPRS) access network, a universal mobile telecommunications system (UMTS) RAN (UTRAN), an evolved UTRAN (eUTRAN), an Internet protocol (IP) connectivity access network (IPCAN), a code division multiple access (CDMA) network, an evolution-data optimized (EV-DO) network, a wideband CDMA (WCDMA) network, a high speed packet access (HPSA) network, an evolved HPSA (EHPSA+) network, or a long term evolution (LTE) access network. Access network 102 may include one or more transceiver nodes 106 for communicating with UE 104. UE 104 may include a computer, a pager, a mobile phone, a smartphone, a wireless modem, or other devices through which a subscriber accesses network services.

Network environment 100 may further include a carrier network 108. Carrier network 108 may be utilized by UE 104 to access Internet 110. Carrier network 108 may include a bearer binding and event reporting function (BBERF) node 112. BBERF node 112 may be, for example, a service gateway (SGW) or a serving general packet radio service (GPRS) support node (SGSN). Carrier network 108 may further include a PCRF node 114. PCRF node 114 is a centralized node that can act as a policy decision point for carrier network 108. PCRF node 114 may take operator defined service policies, subscription information pertaining to a user, and other data into account to build policy decisions. Policy decisions may be formulated as policy control and charging (PCC) rules. PCC rules may contain information about user plane traffic expressed as a packet filter. A packet filter may take the form of an IP five-tuple specifying: (1) source IP address(es), (2) destination IP address(es), (3) source port number(s), (4) destination port number(s), and (5) application protocol(s) (e.g., transmission control protocol (TCP), user datagram protocol (UDP)). All IP packets matching a packet filter of a PCC rule may be designated an SDF.

Flow-based charging models may introduce the ability to charge for SDFs identified by service data flow filters according to specified charging rules. Charging rules may contain information that allows the filtering of traffic to identify packets belonging to a particular SDF (e.g., IP multimedia subsystem (IMS), file transfer protocol (FTP), browsing) and allow an operator to define how a particular SDF is to be charged (e.g., different media streams within a single packet data protocol (PDP) context.) Charging rules may be requested by a policy and charging enforcement function (PCEF) node (e.g., by a packet data network (PDN) gateway in an evolved packet system (EPS)), at bearer establishment, upon a specified trigger event, and/or upon bearer termination. Such a request may be made using a Gx reference point towards a PCRF.

Carrier network 108 may also include PCEF node 116. PCEF node 116 may serve as a policy enforcement point and may be placed in line between access network 102 and PCRF node 114. PCEF node 116 may be, for example, a gateway GPRS support node (GGSN) or a PDN gateway. As an enforcement point, PCEF node 116 may request and receive policy rules from PCRF node 114. Policy rules may take the form of, for example, Gx rules contained in credit control messages.

Carrier network 108 may also include subscriber data management (SDM) node 118. SDM node 118 may contain a comprehensive subscriber database, including information pertaining to subscribers' locations and Internet protocol information. SDM node 118 may be, for example, a home subscriber server (HSS), a subscription profile repository (SPR), or a user profile serving function (UPSF).

Carrier network 108 may further include service node 120. Service node 120 may include functionality for DPI, content-filtering, and/or web-optimization. DPI is the use of a packet's non-header information by a network entity that is not an endpoint for that packet. For example, service node 120 may include functionality enabling it to examine packets originating in Internet 110 and destined for UE 104. Content-filtering is the blocking of specified content based on analysis of the content itself rather than other criteria such as its source. For example, service node 120 may include functionality enabling it to analyze the content of packets originating in Internet 110 and destined for UE 104. Based on such content-analysis, service node 120 may filter or prevent the content from reaching UE 104. Web-optimization is provided to enhance a user's experience and may involve refining and/or altering content to better suit the hardware and/or software utilized by a particular user. For example, service node 120 may include functionality enabling it to optimize content originating in Internet 110 and destined for UE 104 based on, for example, the type of device UE 104 is. For example, service node 120 may detect video streaming from a source located in Internet 110 and destined for UE 104. In response, service node 120 may, for example, resize the video for optimal display on UE 104. A service node may or may not support the full blown Gx protocol as specified in 3GPP 29.212. For example, service node 120 may not include support for the full blown Gx protocol. In accordance with embodiments of the subject matter described herein, PCRF node 114 may trigger service node 120 to initiate a session with PCRF node 114. PCRF node 114 may utilize the session to communicate with service node 120, enabling it to subscribe to SDF event notifications and install policy rules.

Figure 2:
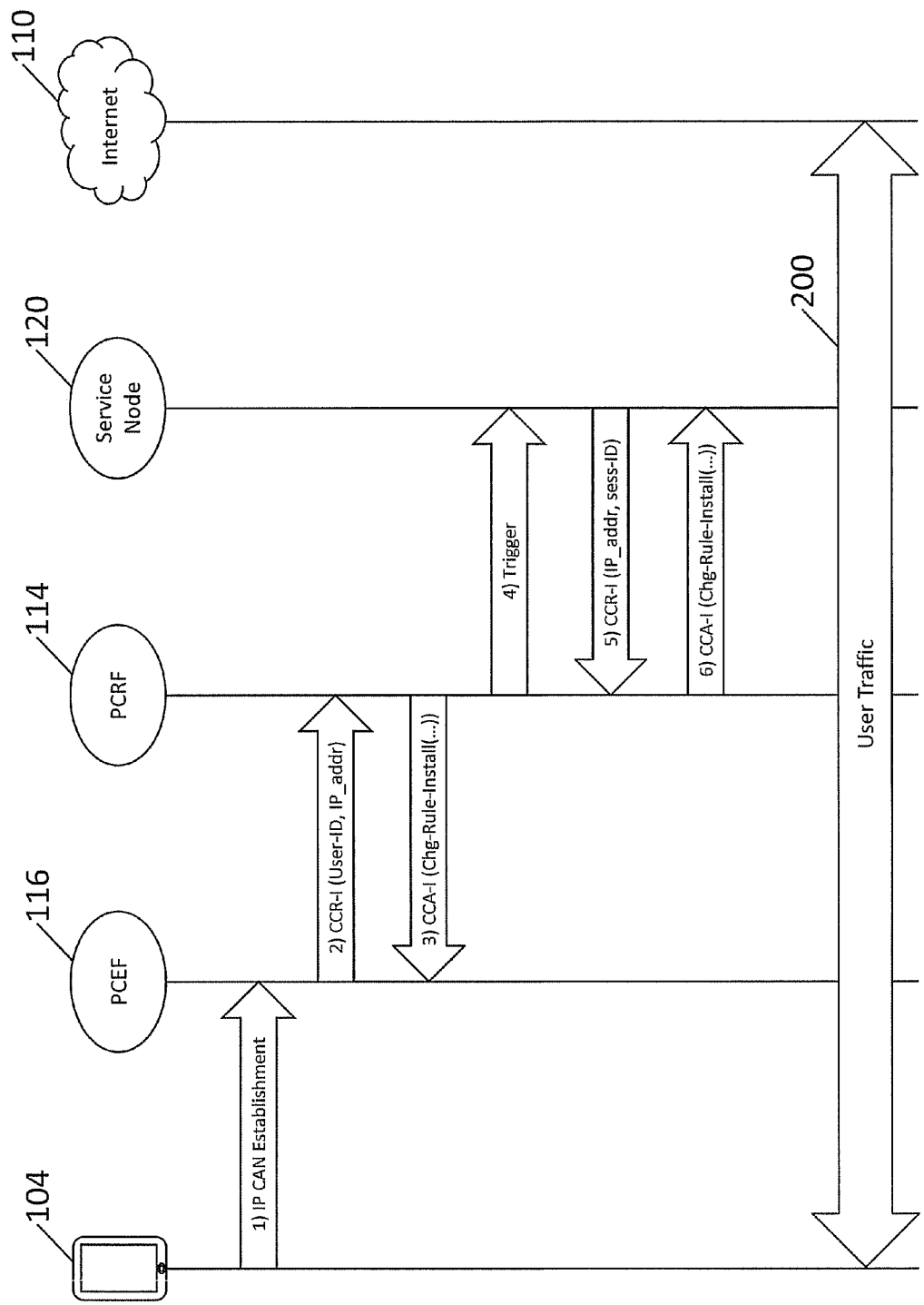
FIG. 2 is a message flow diagram illustrating the triggering of a service node to initiate a session with a PCRF according to an embodiment of the subject matter described herein.

FIG. 2 is a message flow diagram illustrating the initiation of a session with a service node according to an embodiment of the subject matter described herein. Referring to FIG. 2, at step 1, UE 104 may initiate establishment of an IP CAN session with PCEF node 116 for the purpose of communicating with a host in Internet 110. At step 2, PCEF node 116 may send a credit-control-request initial (CCR-I) message to PCRF node 114. The CCR-I message may include a user ID and IP address associated with UE 104. At step 3, PCRF node 114 may send a credit-control-answer initial (CCA-I) message to PCEF node 116. The CCA-I message may include a charging rule for PCEF node 116 to implement with respect to UE 104's IP CAN session. PCEF node 116 may support an implementation of the full blown Gx protocol and thus the CCR-I/CCA-I exchange, between PCEF node 116 and PCRF node 114, may utilize the Gx protocol.

User data plane 200, carrying traffic associated with UE 104's IP CAN session, may traverse service node 120. PCRF node 114 may desire to communicate with service node 120 in order to subscribe to SDF event notifications and/or install policy rule(s). Service node 120 may not implement the full blown Gx protocol and thus utilization of the Gx protocol may not be possible. PCRF node 114 and service node 120 may utilize a subset of the Gx application/protocol that does not include all of the parameter/attribute value pairs (AVPs) designated as mandatory in 3GPP 29.212 to communicate. For example, commonly owned, co-pending U.S. Patent Application entitled "Methods, Systems, and Computer Readable Media for Communicating Policy Information Between a Policy and Charging Rules Function and a Service Node," filed on Mar. 15, 2011, (Ser. No. 13/048,607), herein incorporated by reference in its entirety, discloses the utilization of such a subset of the Gx application/protocol (hereinafter "Gx-Lite") and may enable the communication of policy information between PCRF node 114 and service node 120.

When utilizing Gx-Lite, it may be preferable and/or necessary for service node 120 to serve as the session client. To serve as the session client, service node 120 may be required to initiate the session. Often, however, service node 120 may not be aware of UE 104's IP CAN session and thus may be unaware of a need to initiate a session with PCRF node 114. Accordingly, in order for service node 120 to serve as the session client, PCRF node 114 may need to trigger service node 120 to initiate a session with PCRF node 114. In accordance with embodiments of the subject matter described herein PCRF node 114 may determine, independent of contact from service node 120, that service node 120 requires policy information. In response to determining that service node 120 requires policy information, at step 4, PCRF node 114 may send a session independent trigger message to service node 120 that includes information instructing service node 120 to initiate a session with PCRF node 114 to obtain the policy information from PCRF node 114. The trigger message may include a hypertext transfer protocol (HTTP) POST request. The HTTP POST request may include a simple object access protocol (SOAP) payload, which may specify an IP address associated with PCRF node 114, an IP address associated with UE 104, and/or a network access identifier (NAI) associated with UE 104. The NAI may be an international mobile station identifier (IMSI), a mobile subscriber integrated services digital network number (MSISDN), a uniform resource identifier (URI), an IMS public identity, or an IMS private identity.

Table 1 illustrates an exemplary trigger message. The message may invoke the HTTP POST method to enable PCRF node 114 to send information to service node 120. For example, Line 1 illustrates the inclusion of the HTTP POST request. The message may further include the host header field for identifying the resource being requested. For example, Line 2 illustrates the host field identifying service node 120. The message may further include the content type header field for identifying the media type contained in the body of the message. For example, Line 3 illustrates the content type header field identifying a SOAP body. The message may further include the content length header field for identifying the length of the message. For example, Line 4 illustrates the content length header field specifying the symbolic message length "nnnn" to denote the length of the message. The message may further include an extensible markup language (XML) prolog containing an XML declaration. For example, Line 5 illustrates an XML prolog having an XML declaration specifying XML version 1.0. The message may further include an opening SOAP envelope tag. For example, Line 6 illustrates an opening SOAP envelope tag, indicating the beginning of the SOAP parameters. The message may further include the XML name space field for identifying the envelope. For example, Line 7 illustrates the XML name space field designating the envelope as SOAP. The message may further include a designation of the encoding style. For example, Line 8 illustrates the designation of an exemplary encoding style. The message may further include the data field for designating the beginning of the SOAP parameters. For example, Line 9 illustrates the inclusion of the data field. The message may further include an XML prolog containing an XML declaration. For example, Line 10 illustrates an XML prolog having an XML declaration specifying XML version 1.0 and character encoding using 8-bit unicode transformation format (UTF). The message may further include an action parameter. For example, Line 11 illustrates an action parameter instructing service node 120 to initiate a Gx-Lite session with PCRF node 114. The message may further include a parameter identifying the IP address of the PCRF. For example, Line 12 identifies an IP address associated with PCRF node 114. The message may further include a parameter designating a NAI. For example, Line 13 illustrates a parameter designating an IMSI associated with a subscriber utilizing UE 104. The message may further include a parameter designating the IP address of a subscriber. For example, Line 14 illustrates a parameter designating an IP address associated with UE 104. The message may further include a closing SOAP envelope tag. For example, Line 15 illustrates a closing SOAP envelope tag, indicating the end of the SOAP parameters.

TABLE 1

```
01: POST /OrderEntry HTTP/1.1
02: Host: dpi.operator_x.com
03: Content-Type: application/soap; charset="utf-8"
04: Content-Length: nnnn
05: <?xml version="1.0"?>
06: <SOAP-ENV:Envelope>
07: xmlns:SOAP-ENV="http://www.w3.org/2001/12/soap-envelope"
08: SOAP-ENV:encodingStyle="http://www.w3.org/2001/12/soap-encoding"
09:     Data =
10:     <?xml version="1.0" encoding="UTF-8"?>
11:     <Action>start_Gx-Lite-Session-with-Me</Action>
12:     <PCRF_IP_Address>100.200.1.2</PCRF_IP_Address>
13:     <User-IMSI>310150123456789</User-IMSI>
14:     <User-IP_Address>1.2.3.4</User-IP_Address>
15: </SOAP-ENV:Envelope>
```

At step 5, in response to the external trigger, service node 120 may send a message to PCRF node 114 which includes the IP address associated with UE 104. The message may be sent, for example, via a Gx-Lite CCR-I Diameter message.

Table 2 illustrates an exemplary Gx-Lite CCR-I message. The message may include the version field for specifying version information. For example, Line 1 illustrates the version field specifying version 1.0. The message may further include the message length field for specifying the message's length, including any header information. For example, Line 2 illustrates the message length field specifying the symbolic message length 'XXX' to denote the length of the message. The message may further include the command flags field. For example, Line 3 illustrates the command flags field with the r-bit set to "REQ" to indicate that the message is a request and the p-bit set to "PXY" to indicate that the message is proxiable. The message may further include the command codes field. For example, Line 4 illustrates the command codes field with the credit-control command code 272, corresponding with a credit-control-request. The message may further include the application ID field to identify to which application the message is applicable. For example, Line 5 illustrates the application ID field with a four octet vendor specific application ID. The message may further include a hop-by-hop ID field to aid in matching requests and replies. For example, Line 6 illustrates the hop-by-hop ID field specifying a symbolic hop-by-hop ID "YYYY" to denote a unique hop-by-hop ID. The message may further include an end-to-end ID field for detecting duplicate messages. For example, Line 7 illustrates an end-to-end ID field specifying a symbolic end-to-end ID "ZZZZZZZZ" to denote a unique end-to-end ID. The message may further include the AVPs field for indicating the beginning of AVPs. For example, Line 8 illustrates the AVPs field.

AVPs may be used to encapsulate information relevant to the message. The message may include a session ID AVP. For example, Line 9 illustrates a session ID AVP corresponding with the global identifier of the session. The message may further include an authentication application ID AVP or an accounting application ID AVP. For example, Line 10 illustrates an authentication ID AVP identifying the authentication and authorization portion of the application. The message may further include the origin host AVP and convey the fully qualified domain name of the node that generated the request. For example, Line 11 illustrates an origin host AVP corresponding with service node 120. The message may further include the origin realm AVP indicating the realm of the node that generated the request. For example, Line 12 illustrates an origin realm AVP indicating the realm of service node 120. The message may further include the destination realm AVP indicating the realm of the node the message is destined for. For example, Line 13 illustrates a destination realm AVP indicating the realm of PCRF node 114. The message may further include the CC-request-type AVP indicating the type of credit control request. For example, Line 14 illustrates the CC-request-type AVP corresponding with an initial request. The message may further include the CC-request-number AVP indicating the credit control request number. For example, Line 15 illustrates the CC-request-number AVP "0" denoting a first request.

The message may include an indication of the beginning of subscription information. For example, Line 16 illustrates an indication that subscription information is included. In some embodiments, PCRF node 114 may support receiving multiple subscription IDs in a single message. The message may further include the subscription-ID-type AVP for specifying the format of the subscription ID information. For example, Line 17 illustrates the subscription-ID-type AVP indicating that the subscription ID information is an end user IMSI. The message may further include the subscription-ID-data AVP for providing the subscription ID information itself. For example, Line 18 illustrates the subscription-ID-data AVP specifying the symbolic value "IMSI" to denote an IMSI associated with UE 104. The message may further include the supported-features AVP for informing the destination host of the features supported by the originating host. For example, Line 19 illustrates the supported-features AVP for informing PCRF node 114 of the features supported by service node 120. The message may further include the vendor-ID AVP for identifying the vendor of the originating host. For example, Line 20 illustrates the vendor-ID AVP specifying the vendor "Camiant" of service node 120. The message may further include the feature-list-ID AVP identifying the appropriate feature list from multiple possible supported feature lists. For example, Line 21 illustrates the feature-list-ID AVP indicating symbolic feature list "1" of multiple possible supported feature lists. The message may further include the feature-list AVP identifying the supported features. For example, Line 22 illustrates the feature-list AVP specifying features supported by service node 120 (e.g., "Gx-Lite"). The message may further include the framed-IP-address AVP indicating an address to be configured for the user. The IP address specified may be, for example, a version 4 or version 6 address. For example, Line 23 illustrates the framed-IP-address AVP specifying an IP address associated with UE 104.

TABLE 2

| | | |
|---|---|---|
| 01: Version | = 1 | |
| 02: Message Length | = XXX | |
| 03: Command Flags | = REQ, PXY | |
| 04: Command Code | = Credit-control (272) | |
| 05: Application Id | = 16777238 | |
| 06: Hop-By-Hop-Id | = YYYY | |
| 07: End-To-End-Id | = ZZZZZZZZ | |
| 08: AVPs | | |
| 09: Session-Id | | = NON-3GPP PCEF.Op.com; 1876543210;102 |
| 10: Auth-Application-Id | | = 16777238 |
| 11: Origin-Host | | = NON-3GPP PCEF.Op.com |
| 12: Origin-Realm | | = Op.com |
| 13: Destination-Realm | | = Op.com |
| 14: CC-Request-Type | | = INITIAL_REQUEST (1) |
| 15: CC-Request-Number | | = 0 |
| 16: [Subscription-Id] // optional | | |
| 17:     Subscription-Id-Type | | = END_USER_IMSI (1) |
| 18:     Subscription-Id-Data | | = <IMSI> |
| 19: Supported-Features | | |
| 20:     Vendor-Id | | = Camiant (21274) |
| 21:     Feature-List-ID | | = TBD [e.g., 1] |
| 22:     Feature-List | | = TBD [e.g., Gx-Light] |
| 23:     Framed-IP-Address | | = 192.168.2.11 |

Utilizing the IP address included in the CCR-I message, PCRF node 114 may determine a NAI for a subscriber associated with UE 104. The NAI may be an IMSI, a MSISDN, a URI, an IMS public identity, or an IMS private identity. PCRF node 114 may query SDM node 118 in order to determine a NAI for the subscriber based on the IP address. In one embodiment, PCRF node 114 may utilize information derived from exchanges with PCEF node 116 to determine the NAI. For example, commonly owned, co-pending U.S. patent application entitled "Methods, Systems, and Computer Readable Media for Performing PCRF-Based User Information Pass Through," filed on Mar. 15, 2011, (Serial No. not yet assigned), herein incorporated by reference in its entirety, discloses an approach for providing a PCRF with user ID and/or IP address information.

Having determined a NAI for the subscriber associated with UE 104, PCRF node 114 may utilize the NAI to select an appropriate policy rule. The policy rule selected may authorize or de-authorize a content-filtering service and/or a web-optimization service for the subscriber associated with UE 104. The policy rule selected may specify user data plane content that is to be blocked for the subscriber associated with UE 104. For example, the policy rule may specify to block user data plane content associated with a uniform resource location (URL), a web page, a text string, an image, and/or a video. At step 6, PCRF node 114 may communicate the selected policy rule to service node 120 via a message. The message may be sent, for example, via a Gx-Lite CCA-I Diameter message.

Table 3 illustrates an exemplary Gx-Lite CCA-I message. The message may include the version field for specifying version information. For example, Line 1 illustrates the version field specifying version 1.0. The message may further include the message length field for specifying the message's length, including any header information. For example, Line 2 illustrates the message length field specifying the symbolic message length "XXX" to denote the length of the message illustrated. The message may further include the command flags field. For example, Line 3 illustrates the command flags field with the p-bit set to "PXY" to indicate that the message is proxiable. The message may further include the command codes field. For example, Line 4 illustrates the command codes field with the credit-control command code 272, corresponding with a credit-control-request. The message may further include the application ID field to identify to which application the message is applicable. For example, Line 5 illustrates the application ID field with a four octet vendor specific application ID. The message may further include a hop-by-hop ID field to aid in matching requests and replies. For example, Line 6 illustrates the hop-by-hop ID field specifying a symbolic hop-by-hop ID "YYYY" to denote a unique hop-by-hop ID. The message may further include an end-to-end ID field for detecting duplicate messages. For example, Line 7 illustrates an end-to-end ID field specifying a symbolic end-to-end ID "ZZZZZZZZ" to denote a unique end-to-end ID. The message may further include the AVPs field for indicating the beginning of AVPs. For example, Line 8 illustrates the AVPs field.

AVPs may be used to encapsulate information relevant to the message. The message may include a session ID AVP. For example, Line 9 illustrates a session ID AVP corresponding with the global identifier of the session. The message may further include a result code AVP for reporting potential errors. For example, Line 10 illustrates the result code AVP "2001" indicating that the request was successfully completed. The message may further include the origin host AVP and convey the fully qualified domain name of the node that generated the answer. For example, Line 11 illustrates an origin host AVP corresponding with PCRF node 114. The message may further include the origin realm AVP indicating the realm of the node that generated the answer. For example, Line 12 illustrates an origin realm AVP indicating the realm of PCRF node 114. The message may further include an authentication application ID AVP or an accounting application ID AVP. For example, Line 13 illustrates an authentication ID AVP identifying the authentication and authorization portion of the application. The message may further include the CC-request-type AVP indicating the type of credit control request. For example, Line 14 illustrates the CC-request-type AVP corresponding with an initial request. The message may further include the CC-request-number AVP indicating the credit control request number. For example, Line 15 illustrates the CC-request-number AVP "0" denoting a first request.

The message may further include the supported-features AVP for informing the destination host of the features supported by the originating host. For example, Line 16 illustrates the supported-features AVP for informing service node 120 of the features supported by PCRF node 114. The message may further include the vendor-ID AVP for identifying the vendor of the originating host. For example, Line 17 illustrates the vendor-ID AVP specifying the vendor "Camiant" of PCRF node 114. The message may further include the feature-list-ID AVP identifying the appropriate feature list from multiple possible supported feature lists. For example, Line 18 illustrates the feature-list-ID AVP indicating symbolic feature list "1" of multiple possible supported feature lists. The message may further include the feature-list AVP identifying the supported features. For example, Line 19 illustrates the feature-list AVP specifying features supported by PCRF node 114 (e.g., "Gx-Lite"). The message may further include the charging rule install AVP for specifying charging rules to be installed. For example, Line 20 illustrates the charging rule install AVP. The message may further include the charging rule name AVP and identify charging rules to install. Charging rules may be predefined or dynamic. For example, Lines 21 and 22 both illustrate the charging rule name AVP respectively specifying the predefined "Default_Traffic" charging rule and the predefined "P2P_Traffic" charging rule for installation at service node 120 with respect to UE 104's IP CAN session.

TABLE 3

| | | |
|---|---|---|
| 01: | Version | = 1 |
| 02: | Message Length | = XXX |
| 03: | Command Flags | = PXY |
| 04: | Command Code | = Credit-control (272) |
| 05: | Application Id | = 16777238 |
| 06: | Hop-By-Hop-Id | = YYYY |
| 07: | End-To-End-Id | = ZZZZZZZZ |
| 08: | AVPs | |
| 09: | Session-Id | = NON-3GPP PCEF.Op.com; 1876543210;102 |
| 10: | Result-Code | = DIAMETER_SUCCESS (2001) |
| 11: | Origin-Host | = pcrf1.Op.com |
| 12: | Origin-Realm | = Op.com |
| 13: | Auth-Application-Id | = 16777238 |
| 14: | CC-Request-Type | = INITIAL_REQUEST(1) |
| 15: | CC-Request-Number | = 0 |
| 16: | Supported Features | |
| 17: | Vendor-Id | = Camiant (21274) |
| 18: | Feature-List-ID | = TBD [e.g., 1] |
| 19: | Feature-List | = TBD [e.g., Gx-Light] |
| 20: | Charging-Rule-Install | |
| 21: | Charging-Rule-Name | = Default-Traffic |
| 22: | Charging-Rule-Name | = P2P_Traffic |

Upon receiving the message from PCRF node 114, service node 120 may implement the policy rule(s) with respect to UE 104's IP CAN session.

Figure 3:
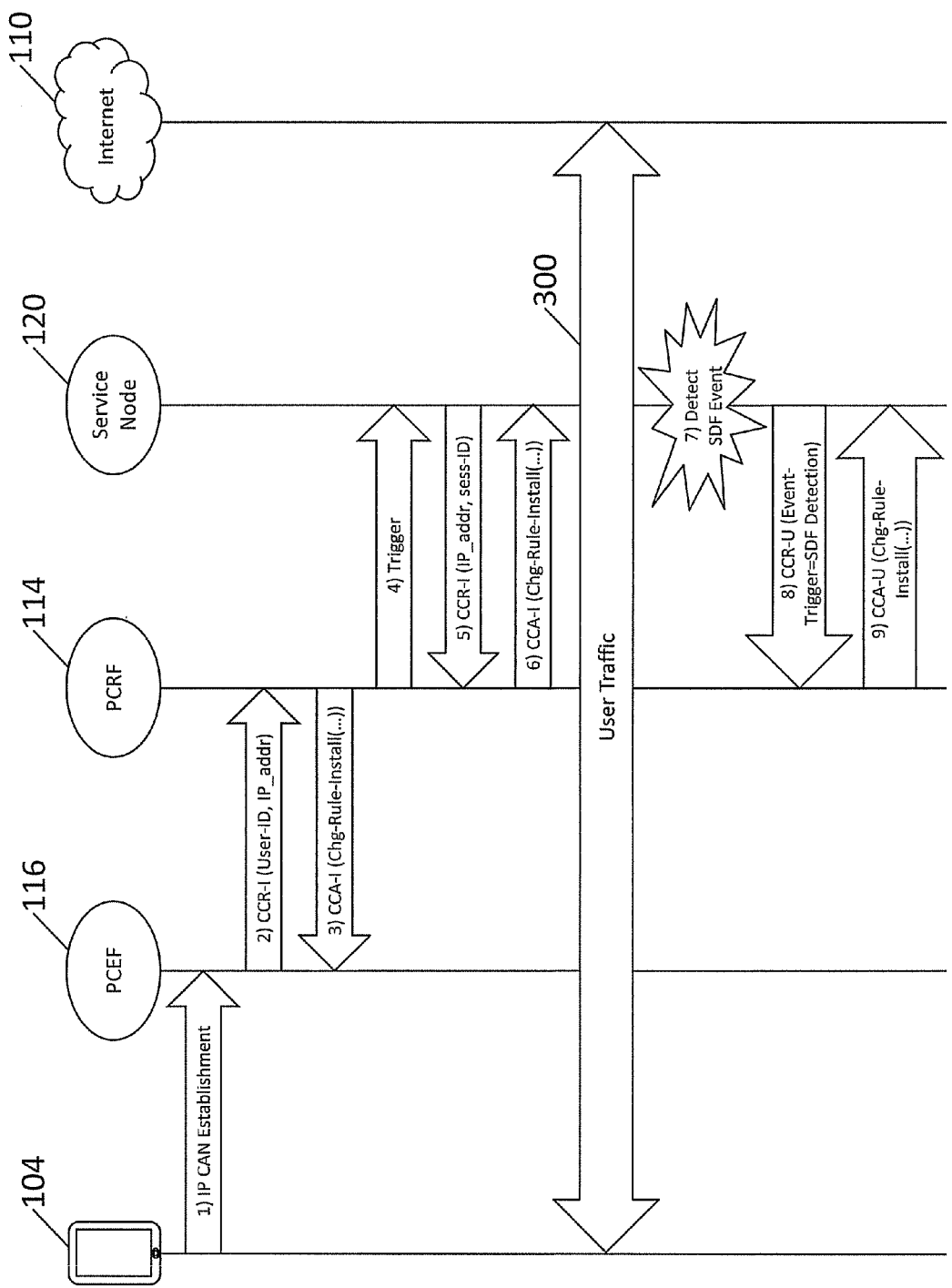
FIG. 3 is a message flow diagram illustrating the triggering of a service node to initiate a session with a PCRF, initiation of the session between the service node and the PCRF, utilization of the session for event subscription and notification, and utilization of the session for policy communication according to an embodiment of the subject matter described herein.

FIG. 3 is a message flow diagram illustrating the initiation of a session with a service node and the utilization of the session for event subscription, event notification, and policy communication according to an embodiment of the subject matter described herein. Referring to FIG. 3, at step 1, UE 104 may initiate establishment of an IP CAN session with PCEF node 116 for the purpose of communicating with a host in Internet 110. At step 2, PCEF node 116 may send a CCR message to PCRF node 114. The CCR message may include a user ID and IP address associated with UE 104. At step 3, PCRF node 114 may send a CCA message to PCEF node 116. The CCA message may include a charging rule for PCEF node 116 to implement with respect to UE 104's IP CAN session. PCEF node 116 may support an implementation of the full blown Gx protocol and thus the CCR/CCA exchange, between PCEF node 116 and PCRF node 114, may utilize the Gx protocol.

User data plane 700, carrying traffic associated with UE 104's IP CAN session, may traverse service node 120. PCRF node 114 may desire to communicate with service node 120 in order to subscribe to SDF event notifications and/or install policy rule(s). Service node 120 may not implement the full blown Gx protocol and thus utilization of the Gx protocol may not be possible. In accordance with embodiments of the subject matter described herein, PCRF node 114 may communicate with service node 120 in order to subscribe to SDF event notifications and/or install policy rule(s).

It may be preferable and/or necessary for service node 120 to serve as the session client. To serve as the session client, service node 120 may be required to initiate the session. Often, however, service node 120 may not be aware of UE 104's IP CAN session and thus may be unaware of a need to initiate a session with PCRF node 114. Accordingly, in order for service node 120 to serve as the session client, PCRF node 114 may need to trigger service node 120 to initiate a session with PCRF node 114. In accordance with embodiments of the subject matter described herein PCRF node 114 may determine, independent of contact from service node 120, that service node 120 requires policy information. In response to determining that service node 120 requires policy information, at step 4, PCRF node 114 may send a session independent trigger message to service node 120 that includes information instructing service node 120 to initiate a session with PCRF node 114 to obtain the policy information from PCRF node 114. The trigger message may include a HTTP POST request. The HTTP POST request may include a SOAP payload, which may specify an IP address associated with PCRF node 114, an IP address associated with UE 104, and/or a NAI associated with UE 104. The NAI may be an IMSI, a MSISDN, a URI, an IMS public identity, or an IMS private identity.

Table 4 illustrates an exemplary trigger message. The message may invoke the HTTP POST method to enable PCRF node 114 to send information to service node 120. For example, Line 1 illustrates the inclusion of the HTTP POST request. The message may further include the host header field for identifying the resource being requested. For example, Line 2 illustrates the host field identifying service node 120. The message may further include the content type header field for identifying the media type contained in the body of the message. For example, Line 3 illustrates the content type header field identifying a SOAP body. The message may further include the content length header field for identifying the length of the message. For example, Line 4 illustrates the content length header field specifying the symbolic message length "nnnn" to denote the length of the message. The message may further include an extensible markup language (XML) prolog containing an XML declaration. For example, Line 5 illustrates an XML prolog having an XML declaration specifying XML version 1.0. The message may further include an opening SOAP envelope tag. For example, Line 6 illustrates an opening SOAP envelope tag, indicating the beginning of the SOAP parameters. The message may further include the XML name space field for identifying the envelope. For example, Line 7 illustrates the XML name space field designating the envelope as SOAP. The message may further include a designation of the encoding style. For example, Line 8 illustrates the designation of an exemplary encoding style. The message may further include the data field for designating the beginning of the SOAP parameters. For example, Line 9 illustrates the inclusion of the data field. The message may further include an XML prolog containing an XML declaration. For example, Line 10 illustrates an XML prolog having an XML declaration specifying XML version 1.0 and character encoding using 8-bit unicode transformation format (UTF). The message may further include an action parameter. For example, Line 11 illustrates an action parameter instructing service node 120 to initiate a Gx-Lite session with PCRF node 114. The message may further include a parameter identifying the IP address of the PCRF. For example, Line 12 identifies an IP address associated with PCRF node 114. The message may further include a parameter designating a NAI. For example, Line 13 illustrates a parameter designating an IMSI associated with a subscriber utilizing UE 104. The message may further include a parameter designating the IP address of a subscriber. For example, Line 14 illustrates a parameter designating an IP address associated with UE 104. The message may further include a closing SOAP envelope tag. For example, Line 15 illustrates a closing SOAP envelope tag, indicating the end of the SOAP parameters.

TABLE 4

```
01: POST /OrderEntry HTTP/1.1
02: Host: dpi.operator_x.com
03: Content-Type: application/soap; charset="utf-8"
04: Content-Length: nnnn
05: <?xml version="1.0"?>
06: <SOAP-ENV:Envelope>
07: xmlns:SOAP-ENV="http://www.w3.org/2001/12/soap-envelope"
08: SOAP-ENV:encodingStyle="http://www.w3.org/2001/12/soap-encoding"
09:     Data =
10:     <?xml version="1.0" encoding="UTF-8"?>
11:     <Action>start_Gx-Lite-Session-with-Me</Action>
12:     <PCRF_IP_Address>100.200.1.2</PCRF_IP_Address>
13:     <User-IMSI>310150123456789</User-IMSI>
14:     <User-IP_Address>1.2.3.4</User-IP_Address>
15: </SOAP-ENV:Envelope>
```

At step 5, in response to the external trigger, service node 120 may send a message to PCRF node 114 which includes the IP address associated with UE 104. The message may be sent, for example, via a Gx-Lite CCR-I Diameter message.

Table 5 illustrates an exemplary Gx-Lite CCR-I message. The message may include the version field for specifying version information. For example, Line 1 illustrates the version field specifying version 1.0. The message may further include the message length field for specifying the message's length, including any header information. For example, Line 2 illustrates the message length field specifying the symbolic message length "XXX" to denote the length of the message. The message may further include the command flags field. For example, Line 3 illustrates the command flags field with the r-bit set to "REQ" to indicate that the message is a request and the p-bit set to "PXY" to indicate that the message is proxiable. The message may further include the command codes field. For example, Line 4 illustrates the command codes field with the credit-control command code 272, corresponding with a credit-control-request. The message may further include the application ID field to identify to which application the message is applicable. For example, Line 5 illustrates the application ID field with a four octet vendor specific application ID. The message may further include a hop-by-hop ID field to aid in matching requests and replies. For example, Line 6 illustrates the hop-by-hop ID field specifying a symbolic hop-by-hop ID "YYYY" to denote a unique hop-by-hop ID. The message may further include an end-to-end ID field for detecting duplicate messages. For example, Line 7 illustrates an end-to-end ID field specifying a symbolic end-to-end ID "ZZZZZZZZ" to denote a unique end-to-end ID. The message may further include the AVPs field for indicating the beginning of AVPs. For example, Line 8 illustrates the AVPs field.

AVPs may be used to encapsulate information relevant to the message. The message may include a session ID AVP. For example, Line 9 illustrates a session ID AVP corresponding with the global identifier of the session. The message may further include an authentication application ID AVP or an accounting application ID AVP. For example, Line 10 illustrates an authentication ID AVP identifying the authentication and authorization portion of the application. The message may further include the origin host AVP and convey the fully qualified domain name of the node that generated the request. For example, Line 11 illustrates an origin host AVP corresponding with service node 120. The message may further include the origin realm AVP indicating the realm of the node that generated the request. For example, Line 12 illustrates an origin realm AVP indicating the realm of service node 120. The message may further include the destination realm AVP indicating the realm of the node the message is destined for. For example, Line 13 illustrates a destination realm AVP indicating the realm of PCRF node 114. The message may further include the CC-request-type AVP indicating the type of credit control request. For example, Line 14 illustrates the CC-request-type AVP corresponding with an initial request. The message may further include the CC-request-number AVP indicating the credit control request number. For example, Line 15 illustrates the CC-request-number AVP "0" denoting a first request.

The message may include an indication of the beginning of subscription information. For example, Line 16 illustrates an indication that subscription information is included. In some embodiments, PCRF node 114 may support receiving multiple subscription IDs in a single message. The message may further include the subscription-ID-type AVP for specifying the format of the subscription ID information. For example, Line 17 illustrates the subscription-ID-type AVP indicating that the subscription ID information is an end user IMSI. The message may further include the subscription-ID-data AVP for providing the subscription ID information itself. For example, Line 18 illustrates the subscription-ID-data AVP specifying the symbolic value "IMSI" to denote an IMSI associated with UE 104. The message may further include the supported-features AVP for informing the destination host of the features supported by the originating host. For example, Line 19 illustrates the supported-features AVP for informing PCRF node 114 of the features supported by service node 120. The message may further include the vendor-ID AVP for identifying the vendor of the originating host. For example, Line 20 illustrates the vendor-ID AVP specifying the vendor "Camiant" of service node 120. The message may further include the feature-list-ID AVP identifying the appropriate feature list from multiple possible supported feature lists. For example, Line 21 illustrates the feature-list-ID AVP indicating symbolic feature list "1" of multiple possible supported feature lists. The message may further include the feature-list AVP identifying the supported features. For example, Line 22 illustrates the feature-list AVP specifying features supported by service node 120 (e.g., "Gx-Lite"). The message may further include the framed-IP-address AVP indicating an address to be configured for the user. The IP address specified may be, for example, a version 4 or version 6 address. For example, Line 23 illustrates the framed-IP-address AVP specifying an IP address associated with UE 104.

TABLE 5

| | | |
|---|---|---|
| 01: Version | = 1 | |
| 02: Message Length | = XXX | |
| 03: Command Flags | = REQ, PXY | |
| 04: Command Code | = Credit-control (272) | |
| 05: Application Id | = 16777238 | |
| 06: Hop-By-Hop-Id | = YYYY | |
| 07: End-To-End-Id | = ZZZZZZZZ | |
| 08: AVPs | | |
| 09: Session-Id | | = NON-3GPP PCEF.Op.com; 1876543210;102 |
| 10: Auth-Application-Id | | = 16777238 |
| 11: Origin-Host | | = NON-3GPP PCEF.Op.com |
| 12: Origin-Realm | | = Op.com |
| 13: Destination-Realm | | = Op.com |
| 14: CC-Request-Type | | = INITIAL_REQUEST (1) |
| 15: CC-Request-Number | | = 0 |
| 16: [Subscription-Id] // optional | | |
| 17: Subscription-Id-Type | | = END_USER_IMSI (1) |
| 18: Subscription-Id-Data | | = <IMSI> |
| 19: Supported-Features | | |
| 20: Vendor-Id | | = Camiant (21274) |
| 21: Feature-List-ID | | = TBD [e.g. , 1] |
| 22: Feature-List | | = TBD [e.g., Gx-Light] |
| 23: Framed-IP-Address | | = 192.168.2.11 |

Utilizing the IP address included in the CCR-I message, PCRF node 114 may determine a NAI for a subscriber associated with UE 104. The NAI may be an IMSI, a MSISDN, a URI, an IMS public identity, or an IMS private identity. PCRF node 114 may query SDM node 118 in order to determine a NAI for the subscriber based on the IP address. In one embodiment, PCRF node 114 may utilize information derived from exchanges with PCEF node 116 to determine the NAI.

Having determined a NAI for the subscriber associated with UE 104, PCRF node 114 may utilize the NAI to select an appropriate policy rule. The policy rule selected may authorize or de-authorize a content-filtering service and/or a web-optimization service for the subscriber associated with UE 104. The policy rule selected may specify user data plane content that is to be blocked for the subscriber associated with UE 104. For example, the policy rule may specify to block user data plane content associated with a URL, a web page, a text string, an image, and/or a video. Additionally, PCRF node 114 may determine that it should be notified upon the detection of an SDF event by service node 120 and that it should therefore subscribe to the appropriate SDF detection. At step 6, PCRF node 114 may communicate the selected policy rule and/or the SDF detection subscription to service node 120 via a message. The message may be sent, for example, via a Gx-Lite CCA-I Diameter message.

Table 6 illustrates an exemplary Gx-Lite CCA-I message. The message may include the version field for specifying version information. For example, Line 1 illustrates the version field specifying version 1.0. The message may further include the message length field for specifying the message's length, including any header information. For example, Line 2 illustrates the message length field specifying the symbolic message length "XXX" to denote the length of the message. The message may further include the command flags field. For example, Line 3 illustrates the command flags field with the p-bit set to "PXY" to indicate that the message is proxiable. The message may further include the command codes field. For example, Line 4 illustrates the command codes field with the credit-control command code 272, corresponding with a credit-control-request. The message may further include the application ID field to identify to which application the message is applicable. For example, Line 5 illustrates the application ID field with a four octet vendor specific application ID. The message may further include a hop-by-hop ID field to aid in matching requests and replies. For example, Line 6 illustrates the hop-by-hop ID field specifying a symbolic hop-by-hop ID "YYYY" to denote a unique hop-by-hop ID. The message may further include an end-to-end ID field for detecting duplicate messages. For example, Line 7 illustrates an end-to-end ID field specifying a symbolic end-to-end ID "ZZZZZZZZ" to denote a unique end-to-end ID. The message may further include the AVPs field for indicating the beginning of AVPs. For example, Line 8 illustrates the AVPs field.

AVPs may be used to encapsulate information relevant to the message. The message may include a session ID AVP. For example, Line 9 illustrates a session ID AVP corresponding with the global identifier of the session. The message may further include a result code AVP for reporting potential errors. For example, Line 10 illustrates the result code AVP "2001" indicating that the request was successfully completed. The message may further include the origin host AVP and convey the fully qualified domain name of the node that generated the answer. For example, Line 11 illustrates an origin host AVP corresponding with PCRF node 114. The message may further include the origin realm AVP indicating the realm of the node that generated the answer. For example, Line 12 illustrates an origin realm AVP indicating the realm of PCRF node 114. The message may further include an authentication application ID AVP or an accounting application ID AVP. For example, Line 13 illustrates an authentication ID AVP identifying the authentication and authorization portion of the application. The message may further include the CC-request-type AVP indicating the type of credit control request. For example, Line 14 illustrates the CC-request-type AVP corresponding with an initial request. The message may further include the CC-request-number AVP indicating the credit control request number. For example, Line 15 illustrates the CC-request-number AVP "0" denoting a first request. The message may further include the event trigger AVP for identifying a specified event that should cause service node 120 to re-request PCC rule(s). For example, Line 16 illustrates the event trigger AVP and indicates that service node 120 should re-request PCC rule(s) upon SDF detection. The message may further include the charging rule install AVP for specifying charging rule(s) to be installed. For example, Line 17 illustrates the charging rule install AVP. The message may further include the charging rule name AVP and identify a charging rule(s) to install. A charging rule may be predefined or dynamic. For example, Line 18 illustrates the charging rule name AVP specifying the predefined "Default_Traffic" charging rule for installation at service node 120 with respect to UE 104's IP CAN session. The message may further include an additional charging rule install AVP for specifying additional charging rule(s) to be installed. For example, Line 19 illustrates an additional charging rule install AVP. The message may further include additional charging rule name AVP(s) and identify the additional charging rule(s) to install. For example, Line 20 illustrates an additional charging rule name AVP specifying the predefined "P2P_Traffic" charging rule for installation at service node 120 with respect to UE 104's IP CAN session. The message may further include the service flow detection AVP for enabling SDF event detection. For example, Line 21 illustrates a service flow detection AVP for enabling SDF event detection.

TABLE 6

| | |
|---|---|
| 01: Version | = 1 |
| 02: Message Length | = XXX |
| 03: Command Flags | = PXY |
| 04: Command Code | = Credit-control (272) |
| 05: Application Id | = 16777238 |
| 06: Hop-By-Hop-Id | = YYYY |
| 07: End-To-End-Id | = ZZZZZZZZ |
| 08: AVPs | |
| 09:   Session-Id | = NON-3GPP PCEF.Op.com; 1876543210;102 |
| 10:   Result-Code | = DIAMETER_SUCCESS (2001) |
| 11:   Origin-Host | = pcrf1.Op.com |
| 12:   Origin-Realm | = Op.com |
| 13:   Auth-Application-Id | = 16777238 |
| 14:   CC-Request-Type | = INITIAL_REQUEST (1) |
| 15:   CC-Request-Number | = 0 |
| 16:   Event-Trigger | = SERVICE_FLOW_DETECTION (1002) |
| 17:   Charging-Rule-Install | |
| 18:     Charging-Rule-Name | = Default_Traffic |
| 19:   Charging-Rule-Install | |
| 20:     Charging-Rule-Name | = P2P_Traffic |
| 21:     Service-Flow-Detection | = ENABLE_DETECTION(0) |

At step 7, service node 120 may detect the SDF event specified in the message received from PCRF node 114. At step 8, service node 120 may send a credit-control-request update (CCR-U) message to PCRF node 114 indicating that the SDF event has been detected and re-requesting policy rule(s). The message may be sent, for example, via a Gx-Lite CCR-U Diameter message.

Table 7 illustrates an exemplary Gx-Lite CCR-U message. The message may include the version field for specifying version information. For example, Line 1 illustrates the version field specifying version 1.0. The message may further include the message length field for specifying the message's length, including any header information. For example, Line 2 illustrates the message length field specifying the symbolic message length "XXX" to denote the length of the message. The message may further include the command flags field. For example, Line 3 illustrates the command flags field with the r-bit set to "REQ" to indicate that the message is a request and the p-bit set to "PXY" to indicate that the message is proxiable. The message may further include the command codes field. For example, Line 4 illustrates the command codes field with the credit-control command code 272, corresponding with a credit-control-request. The message may further include the application ID field to identify to which application the message is applicable. For example, Line 5 illustrates the application ID field with a four octet vendor specific application ID. The message may further include a hop-by-hop ID field to aid in matching requests and replies. For example, Line 6 illustrates the hop-by-hop ID field specifying a symbolic hop-by-hop ID "YYYY" to denote a unique hop-by-hop ID. The message may further include an end-to-end ID field for detecting duplicate messages. For example, Line 7 illustrates an end-to-end ID field specifying a symbolic end-to-end ID "ZZZZZZZ" to denote a unique end-to-end ID. The message may further include the AVPs field for indicating the beginning of AVPs. For example, Line 8 illustrates the AVPs field.

AVPs may be used to encapsulate information relevant to the message. The message may include a session ID AVP. For example, Line 9 illustrates a session ID AVP corresponding with the global identifier of the session. The message may further include an authentication application ID AVP or an accounting application ID AVP. For example, Line 10 illustrates an authentication ID AVP identifying the authentication and authorization portion of the application. The message may further include the origin host AVP and convey the fully qualified domain name of the node that generated the request. For example, Line 11 illustrates an origin host AVP corresponding with service node 120. The message may further include the destination host AVP and convey the fully qualified domain name of the node the message is destined for. For example, Line 12 illustrates a destination host AVP corresponding with PCRF node 114. The message may further include the origin realm AVP indicating the realm of the node that generated the request. For example, Line 13 illustrates an origin realm AVP indicating the realm of service node 120. The message may further include the destination realm AVP indicating the realm of the node the message is destined for. For example, Line 14 illustrates a destination realm AVP indicating the realm of PCRF node 114. The message may further include the CC-request-type AVP indicating the type of credit control request. For example, Line 15 illustrates the CC-request-type AVP corresponding with an update request. The message may further include the CC-request-number AVP indicating the credit control request number. For example, Line 16 illustrates the CC-request-number AVP "1" denoting an update request. The message may further include the origin state ID AVP for enabling other Diameter entities to infer that other sessions (i.e., sessions with a lower origin state ID) are no longer active. For example, Line 17 illustrates the origin state ID AVP indicating that sessions with an origin state ID lower than "1164772302" are no longer active. The message may further include the event trigger AVP for identifying the event trigger. For example, Line 18 illustrates the event trigger AVP and identifies the event trigger SDF detection. The message may further include the charging rule report AVP for indicating the beginning of the charging rule report. For example, Line 19 illustrates the charging rule report AVP and indicates the beginning of a charging rule report associated with the SDF detection. The message may further include the charging rule name AVP and identify a charging rule(s) associated with the report. For example, Line 20 illustrates the charging rule name AVP specifying the "P2P_Traffic" charging rule associated with the report. The message may further include the PCC rule status AVP for reporting the current status of the PCC rule. For example, Line 21 illustrates the PCC rule status AVP and reports the current status of the "P2P_Traffic" rule as active.

TABLE 7

```
01: Version         = 1
02: Message Length  = XXX
03: Command Flags   = REQ, PXY
04: Command Code    = Credit-control (272)
05: Application Id  = 16777238
```

TABLE 7-continued

```
06: Hop-By-Hop-Id      = YYYY
07: End-To-End-Id      = ZZZZZZZ
08: AVPs
09:  Session-Id               = NON-3GPP PCEF.Op.com;
                                 1876543210;102
10:  Auth-Application-Id      = 16777238
11:  Origin-Host              = NON-3GPP PCEF.Op.com
12:  Destination-Host         = pcrf1.Op.com
13:  Origin-Realm             = Op.com
14:  Destination-Realm        = Op.com
15:  CC-Request-Type          = UPDATE_REQUEST (2)
16:  CC-Request-Number        = 1
17:  Origin-State-Id          = 1164772302
18:  Event-Trigger            = SERVICE_FLOW_DETECTION (1002)
19:  Charging-Rule-Report     =
20:         Charging-Rule-Name      = P2P_Traffic
21:         PCC-Rule-Status         = Active (0)
```

In response to receiving service node 120's CCR-U message, at step 9, PCRF node 114 may send a credit-control-answer update (CCA-U) message to service node 120. The message may include a charging rule(s) update for service node 120 to implement with respect to UE 104's IP CAN session. The message may be sent, for example, via a Gx-Lite CCA-U Diameter message.

Table 8 illustrates an exemplary Gx-Lite CCA-U message. The message may include the version field for specifying version information. For example, Line 1 illustrates the version field specifying version 1.0. The message may further include the message length field for specifying the message's length, including any header information. For example, Line 2 illustrates the message length field specifying the symbolic message length "XXX" to denote the length of the message. The message may further include the command flags field. For example, Line 3 illustrates the command flags field with the p-bit set to "PXY" to indicate that the message is proxiable. The message may further include the command codes field. For example, Line 4 illustrates the command codes field with the credit-control command code 272, corresponding with a credit-control-request. The message may further include the application ID field to identify to which application the message is applicable. For example, Line 5 illustrates the application ID field with a four octet vendor specific application ID. The message may further include a hop-by-hop ID field to aid in matching requests and replies. For example, Line 6 illustrates the hop-by-hop ID field specifying a symbolic hop-by-hop ID "YYYY" to denote a unique hop-by-hop ID. The message may further include an end-to-end ID field for detecting duplicate messages. For example, Line 7 illustrates an end-to-end ID field specifying a symbolic end-to-end ID "ZZZZZZZ" to denote a unique end-to-end ID. The message may further include the AVPs field for indicating the beginning of AVPs. For example, Line 8 illustrates the AVPs field.

AVPs may be used to encapsulate information relevant to the message. The message may include a session ID AVP. For example, Line 9 illustrates a session ID AVP corresponding with the global identifier of the session. The message may further include an authentication application ID AVP or an accounting application ID AVP. For example, Line 10 illustrates an authentication ID AVP identifying the authentication and authorization portion of the application. The message may further include the origin host AVP and convey the fully qualified domain name of the node that generated the answer. For example, Line 11 illustrates an origin host AVP corresponding with PCRF node 114. The message may further include the origin realm AVP indicating the realm of the node that generated the answer. For example, Line 12 illustrates an origin realm AVP indicating the realm of PCRF node 114. The message may further include the CC-request-type AVP indicating the type of credit control request. For example, Line 15 illustrates the CC-request-type AVP corresponding with an update request. The message may further include the CC-request-number AVP indicating the credit control request number. For example, Line 16 illustrates the CC-request-number AVP "1" denoting an update request. The message may further include a result code AVP for reporting potential errors. For example, Line 15 illustrates the result code AVP "2001" indicating that the request was successfully completed. The message may further include the charging rule remove AVP for specifying charging rules to be uninstalled. For example, Line 16 illustrates the charging rule remove AVP. The message may further include the charging rule name AVP and identify a charging rule to remove. The charging rule may be predefined or dynamic. For example, Line 17 illustrates the charging rule name AVP specifying the predefined "P2P-Traffic" charging rule for removal at service node 120 with respect to UE 104's IP CAN session. The message may further include the charging rule install AVP for specifying charging rules to be installed. For example, Line 18 illustrates the charging rule install AVP. The message may further include the charging rule name AVP and identify a charging rule to install. The charging rule may be predefined or dynamic. For example, Line 19 illustrates the charging rule name AVP specifying the predefined "block_p2p" charging rule for installation at service node 120 with respect to UE 104's IP CAN session.

TABLE 8

| | | |
|---|---|---|
| 01: | Version | = 1 |
| 02: | Message Length | = XXX |
| 03: | Command Flags | = PXY |
| 04: | Command Code | = Credit-control (272) |
| 05: | Application Id | = 16777238 |
| 06: | Hop-By-Hop-Id | = YYYY |
| 07: | End-To-End-Id | = ZZZZZZZZ |
| 08: | AVPS | |
| 09: | Session-Id | = NON-3GPP PCEF.Op.com; 1876543210;102 |
| 10: | Auth-Application-Id | = 16777238 |
| 11: | Origin-Host | = pcrf1.Op.com |
| 12: | Origin-Realm | = Op.com |
| 13: | CC-Request-Type | = UPDATE_REQUEST (2) |
| 14: | CC-Request-Number | = 1 |
| 15: | Result-Code | = DIAMETER_SUCCESS (2001) |
| 16: | Charging-Rule-Remove | |
| 17: | Charging-Rule-Name | = P2P-Traffic |
| 18: | Charging-Rule-Install | |
| 19: | Charging-Rule-Name | = block_p2p |

Service node 120 may then install the charging rule(s) update (i.e., uninstall the "P2P-Traffic" charging rule and install the "block_p2p" charging rule) with respect to UE 104's IP CAN session.

Figure 4:
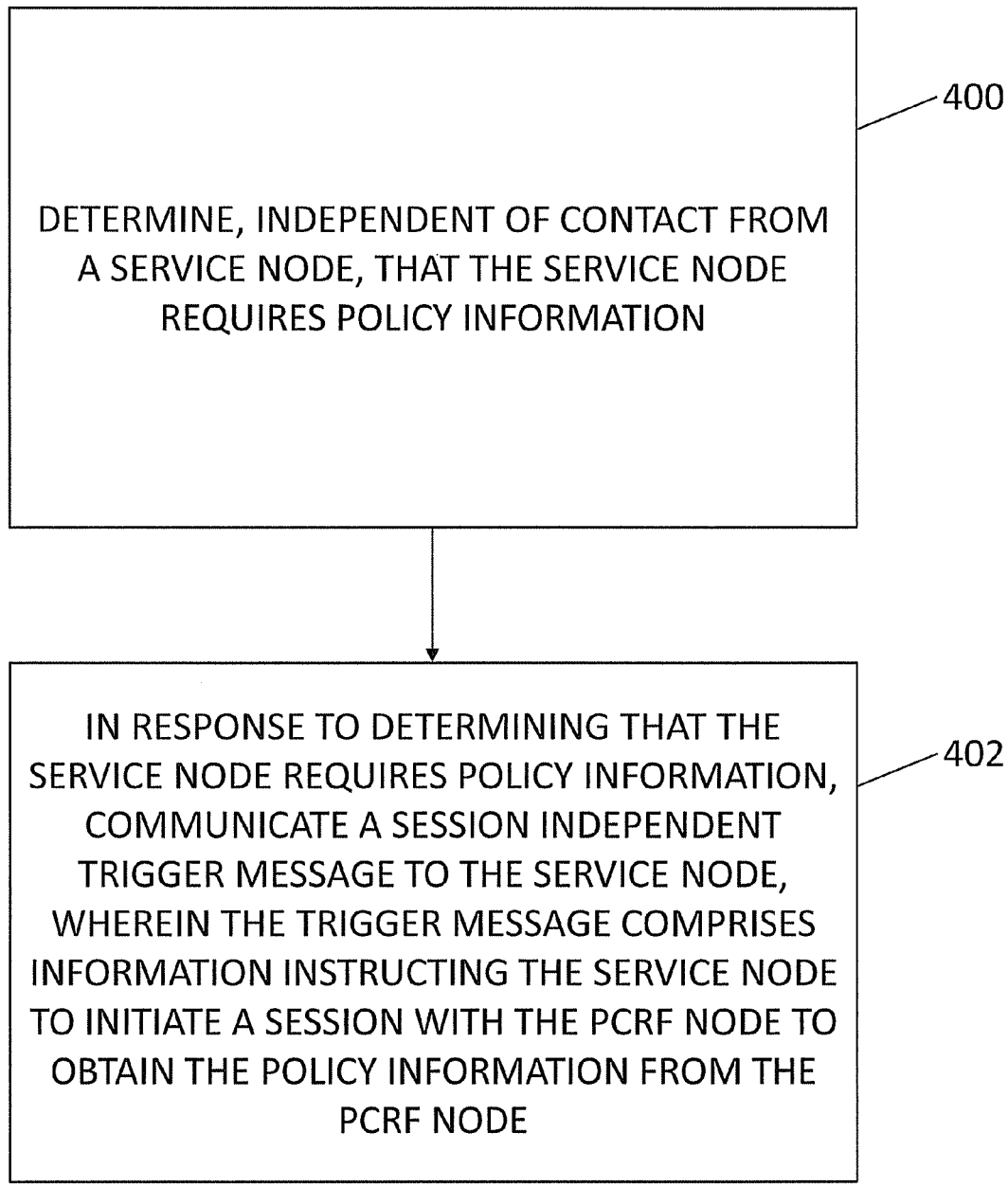
FIG. 4 is a flow chart illustrating an exemplary process for triggering a service node to initiate a session with a PCRF according to an embodiment of the subject matter described herein.

FIG. 4 is a flow chart illustrating an exemplary process for initiating a session with a service node according to an embodiment of the subject matter described herein. Referring to FIG. 4, in step 400, a PCRF node determines, independent of contact from a service node, that the service node requires policy information. For example, PCRF node 114 may determine, independent of contact from service node 120, that service node 120 requires policy information. In step 402, in response to determining that the service node requires policy information, the PCRF node communicates a session independent trigger message to the service node, wherein the trigger message comprises information instructing the service node to initiate a session with the PCRF node to obtain the policy information from the PCRF node. For example, in response to determining that service node 120 requires policy information, PCRF node 114 may communicate a session independent trigger message to service node 120 that includes information instructing service node 120 to initiate a session with PCRF node 114 to obtain the policy information from PCRF node 114. The message may be, for example, an HTTP POST request similar to that illustrated in Table 1.

Figure 5:
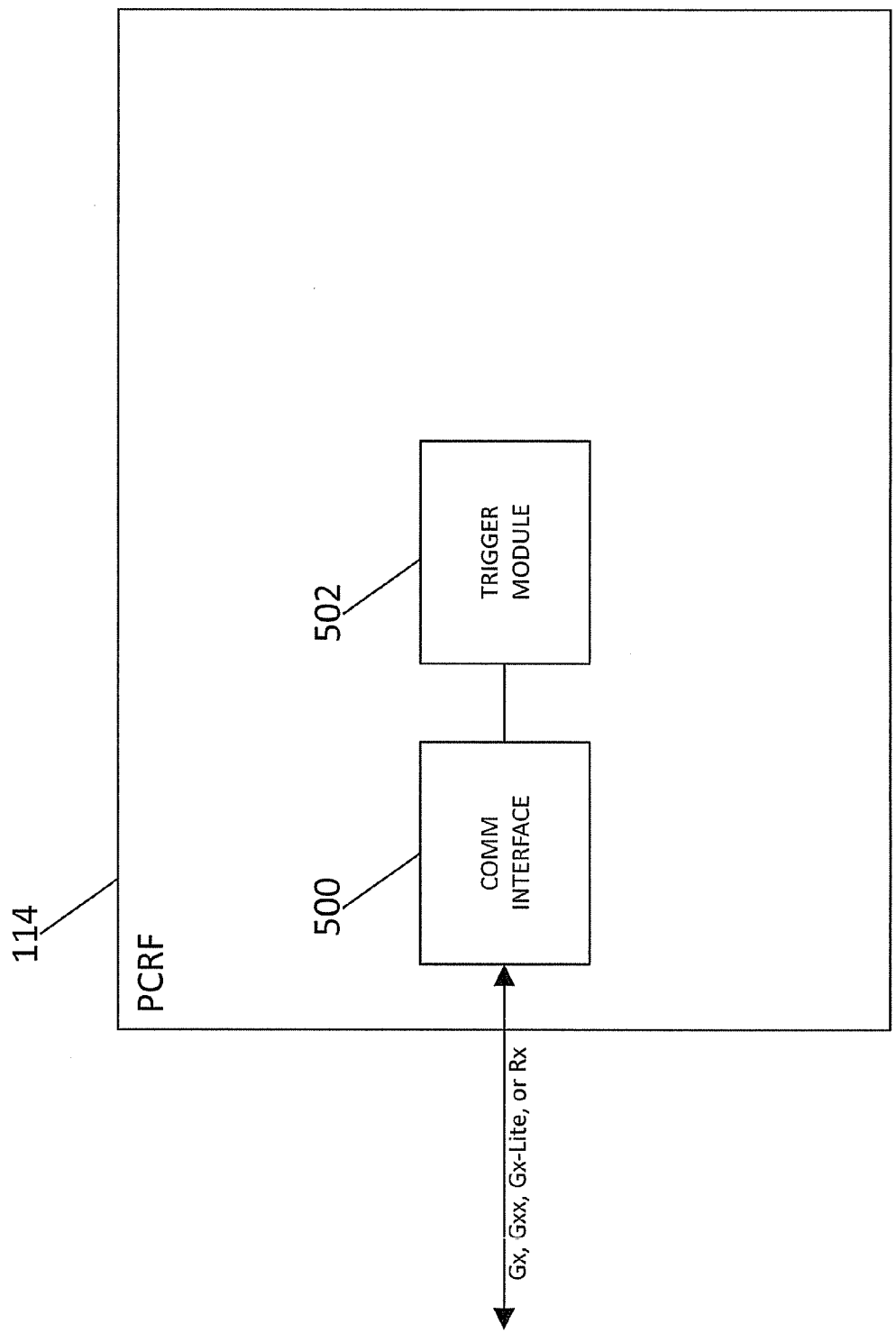
FIG. 5 is a block diagram of an exemplary PCRF node for triggering a service node to initiate a session with a PCRF according to an embodiment of the subject matter described herein.

FIG. 5 is a block diagram of an exemplary PCRF node for initiating a session with a service node according to an embodiment of the subject matter described herein. Referring to FIG. 5, PCRF node 114 includes a communication interface 500 for sending and receiving messages. Communication interface 500 may be capable of communicating with other nodes via any suitable interface, such as a Gx interface, a Gxx interface, a Gx-Lite interface, or an Rx interface. PCRF node 114 further includes a trigger module 502 configured to utilize communication interface 500 to communicate, independent of contact with a service node, a session independent trigger message to the service node, wherein the trigger message comprises information instructing the service node to initiate a session with the PCRF node to obtain policy information from the PCRF node. For example, trigger module 502 may utilize communication interface 500 to communicate, independent of contact with service node 120, a session independent trigger message to service node 120 that includes information instructing service node 120 to initiate a session with PCRF node 114 to obtain policy information from PCRF node 114. The message may be, for example, an HTTP POST request similar to that illustrated in Table 1.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for initiating a session, the method comprising: at a policy and charging rules function (PCRF) node:
   determining, independent of contact from a service node, that the service node requires policy information after receiving a credit control request (CCR) from a policy and charging enforcement function (PCEF) associated with an Internet protocol (IP) connectivity access network (CAN) session involving the service node, wherein the determining that the service node requires policy information further comprises determining that the service node requires policy information based on the IP CAN session involving the service node, wherein the service node is a DPI node; and
   in response to determining that the service node requires policy information, communicating a session independent trigger message from the PCRF node to the service node, wherein the trigger message is sent prior to a session being established between the PCRF node and the service node, wherein the trigger message triggers the service node to initiate a session with the PCRF node to obtain the policy information from the PCRF node, wherein the trigger message includes an Internet protocol (IP) address associated with the PCRF node, wherein after receiving the trigger message and initiating the session, the service node obtains the policy information from the PCRF node.

2. The method of claim 1 comprising:
receiving, from the service node, a message requesting a policy rule, wherein the message includes an IP address associated with a subscriber;
determining a network access identifier (NAI) for the subscriber based on the IP address;
selecting a policy rule for the subscriber based on the NAI; and
communicating the policy rule to the service node.

3. The method of claim 2 wherein determining the NAI for the subscriber comprises querying a subscriber data management (SDM) node.

4. The method of claim 3 wherein the SDM node comprises at least one of a home subscriber server (HSS), a user profile serving function (UPSF), and a subscription profile repository (SPR).

5. The method of claim 2 wherein the message is a Diameter message.

6. The method of claim 2 wherein the policy rule is communicated via a Diameter message.

7. The method of claim 2 wherein the message is received via an interface that implements a subset of the Gx protocol or Gx application.

8. The method of claim 2 wherein the policy rule is communicated via an interface that implements a subset of the Gx protocol or Gx application.

9. The method of claim 2 wherein the policy rule authorizes or de-authorizes at least one of a content-filtering service for the subscriber and a web-optimization service for the subscriber.

10. The method of claim 2 wherein the policy rule specifies user data plane content that is to be blocked for the subscriber.

11. A system for initiating a session, the system comprising:
a policy and charging rules function (PCRF) node, the PCRF node comprising:
a communication interface; and
a trigger module implemented using software executed by one or more physical processors, wherein the trigger module is configured to:
utilize the communication interface to communicate, independent of contact from a service node, a session independent trigger message from the PCRF node to the service node, wherein the trigger message is sent prior to a session being established between the PCRF node and the service node, wherein the trigger message triggers service node to initiate a session with the PCRF node to obtain policy information from the PCRF node, wherein the trigger message includes an Internet protocol (IP) address associated with the PCRF node, wherein after receiving the trigger message and initiating the session, the service node obtains the policy information from the PCRF node,
wherein prior to communicating the session independent trigger message, the PCRF node determines, independent of contact from a service node, that the service node requires policy information after receiving a credit control request (CCR) from a policy and charging enforcement function (PCEF) associated with an Internet protocol (IP) connectivity access network (CAN) session involving the service node, wherein the PCRF node determines that the service node requires policy information based on the IP CAN session involving the service node, wherein the service node is a DPI node.

12. The system of claim 11 wherein the communication interface is configured to:
utilize the communication interface to receive, from the service node, a message requesting a policy rule, wherein the message includes an IP address associated with a subscriber;
determine a network access identifier (NAI) for the subscriber based on the IP address;
select a policy rule for the subscriber based on the NAI; and
utilize the communication interface to communicate the policy rule to the service node.

13. The system of claim 12 wherein the communications interface is configured to determine the NAI for the subscriber by querying a subscriber data management (SDM) node.

14. The system of claim 13 wherein the SDM node comprises at least one of a home subscriber server (HSS), a user profile serving function (UPSF), and a subscription profile repository (SPR).

15. The system of claim 12 wherein the message is a Diameter message.

16. The system of claim 12 wherein the policy rule is communicated via a Diameter message.

17. The system of claim 12 wherein the communication interface is configured to receive the message via the communication interface by implementing a subset of the Gx protocol or Gx application.

18. The system of claim 12 wherein the communication interface is configured to communicate the policy rule via the communication interface by implementing a subset of the Gx protocol or Gx application.

19. The system of claim 12 wherein the policy rule authorizes or de-authorizes at least one of a content-filtering service for the subscriber and a web-optimization service for the subscriber.

20. The system of claim 12 wherein the policy rule specifies user data plane content that is to be blocked for the subscriber.

21. A non-transitory computer readable medium comprising computer executable instructions that when executed by a processor of a computer control the computer to perform steps comprising:
determining, by a policy and charging rules function (PCRF) node and independent of contact from a service node, that the service node requires policy information after receiving a credit control request (CCR) from a policy and charging enforcement function (PCEF) associated with an Internet protocol (IP) connectivity access network (CAN) session involving the service node, wherein the determining that the service node requires policy information further comprises determining that the service node requires policy information based on the IP CAN session involving the service node, wherein the service node is a DPI node; and
in response to determining that the service node requires the policy information, communicating a session independent trigger message from the PCRF node to the service node, wherein the trigger message is sent prior to a session being established between the PCRF node and the service node, wherein the trigger message triggers the service node to initiate a session with the PCRF node to obtain the policy information from the PCRF node, wherein the trigger message includes an Internet protocol (IP) address associated with the PCRF node, wherein after receiving the trigger message and initiating the session, the service node obtains the policy information from the PCRF node.

* * * * *